(12) United States Patent
Wyatt

(10) Patent No.: US 10,221,965 B2
(45) Date of Patent: Mar. 5, 2019

(54) NOISE REDUCING FILLER VALVE

(71) Applicant: Engineered Controls International, LLC, Elon, NC (US)

(72) Inventor: Aaron Dominic Wyatt, Hillsborough, NC (US)

(73) Assignee: Engineered Controls International, LLC, Elon, NC (US)

( * ) Notice: Subject to any disclaimer, the term of this patent is extended or adjusted under 35 U.S.C. 154(b) by 0 days.

(21) Appl. No.: 15/389,109

(22) Filed: Dec. 22, 2016

(65) Prior Publication Data

US 2017/0175930 A1 Jun. 22, 2017

Related U.S. Application Data

(60) Provisional application No. 62/270,946, filed on Dec. 22, 2015.

(51) Int. Cl.
| | |
|---|---|
| F16K 24/00 | (2006.01) |
| F16K 47/08 | (2006.01) |
| F16K 15/06 | (2006.01) |
| F16K 27/02 | (2006.01) |

(52) U.S. Cl.
CPC ............ F16K 47/08 (2013.01); F16K 15/063 (2013.01); F16K 15/066 (2013.01); F16K 27/0209 (2013.01)

(58) Field of Classification Search
CPC ...... F16K 15/063; F16K 15/066; F16K 47/08; F16K 17/0453; F16K 17/085
USPC ........................................................ 137/512
See application file for complete search history.

(56) References Cited

U.S. PATENT DOCUMENTS

| | | | |
|---|---|---|---|
| 1,003,479 | A | 9/1911 | Lucas |
| 3,283,778 | A | 11/1966 | Linna |
| 3,524,469 | A | 8/1970 | Jebe |
| 3,542,063 | A | 11/1970 | Etter et al. |
| 4,259,983 | A | 4/1981 | Kessel |
| 4,269,215 | A | 5/1981 | Odar |
| 4,862,913 | A * | 9/1989 | Wildfang ............. F16K 15/063 137/516.29 |
| 5,215,117 | A | 6/1993 | Petersen et al. |
| 5,319,916 | A | 6/1994 | Ritt et al. |
| 7,322,559 | B2 | 1/2008 | Hall |
| 8,227,677 | B2 | 7/2012 | Wilk |

(Continued)

OTHER PUBLICATIONS

International Search Report and Written Opinion for PCT/US2016/068409 dated Mar. 17, 2017.

*Primary Examiner* — P. Macade Nichols

(74) *Attorney, Agent, or Firm* — Neal, Gerber & Eisenberg LLP

(57) ABSTRACT

A valve includes: (i) a valve seat; (ii) a guide assembly including a check portion, the guide assembly being configured to move between a first closed position where the check portion contacts the valve seat and a first open position where the check portion is spaced apart from the valve seat; (iii) a plurality of guides that are sized and configured to contact an outer perimeter of the guide assembly to axially align the guide assembly at least when (a) the guide assembly is in the first closed position and (b) the guide assembly is in the first open position; (iv) a plurality of channels, each of the plurality of channels being located between at least two of the plurality of guides.

17 Claims, 5 Drawing Sheets

(56) References Cited

U.S. PATENT DOCUMENTS

2005/0226753 A1  10/2005  Montipo
2007/0235559 A1  10/2007  Miyake

\* cited by examiner

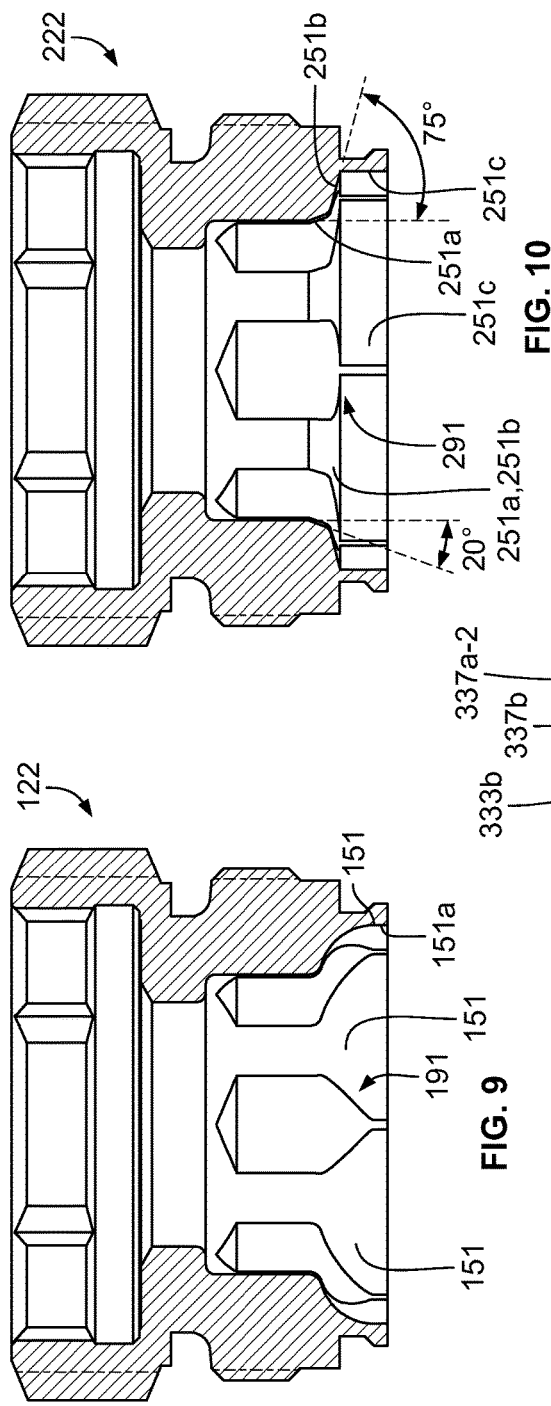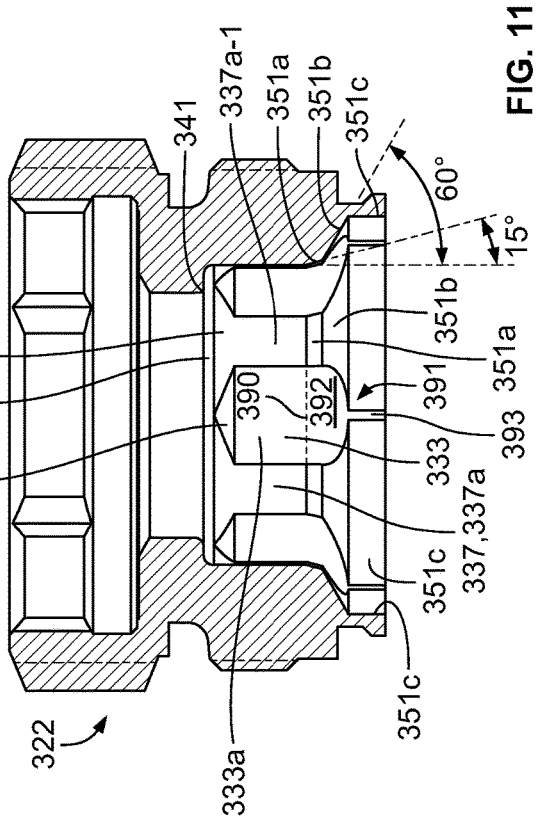

NOISE REDUCING FILLER VALVE

CROSS-REFERENCE

This application claims priority to U.S. Provisional Patent Application No. 62/270,946, filed on Dec. 22, 2015, the contents of which are hereby incorporated by reference in their entirety.

TECHNICAL FIELD

This application relates to filler valves for use in liquid propane tanks, and in particular to an improved valve that reduces noise when in use, and particularly when the pressure differential between the fluid source and the tank being filled is relatively low.

BACKGROUND

Filler valves for selectively flowing liquid propane from an original source, such as a tank mounted to a liquid propane truck, to an ultimate destination, such as a propane tank or receptacle, are generally known. An entrance of the filler valve is typically connected to a nozzle of a hose, which extends to the tank. In such a case, the nozzle of the hose would serve as the direct source of fluid into the filler valve. An exit of the filler valve is typically connected to the receptacle, which serves as the destination of fluid. The fluid may enter a storage portion of the receptacle directly from the filler valve or may pass through a series of valves and/or conduits located inside and/or outside the receptacle before reaching the storage portion of the receptacle. A filler valve (also called a double-check valve) is disclosed in U.S. Pat. No. 5,215,117 to Petersen et al., which is hereby incorporated by reference in its entirety.

Some filler valves open in response to pressure applied by the propane source. For these filler valves to fully open, the pressure differential between the source and the destination must be high. Sometimes the pressure differential is low, such as in cases where the filler valve and fluid source are separated from one another by a long hose. By way of example, this can occur when a tanker truck source is at street level and a receptacle is elevated above street level (e.g., on the second or third story of a building). In these circumstances, the filler valve may only partially or slightly open. The partial opening enables fluid flow from the source to the destination, but the partial opening also causes internal components (e.g., a poppet) of the filler to radially oscillate and thus collide. These collisions generate a loud and distracting rattling noise.

Consequently, a new filler valve is needed that discourages and reduces internal collisions, thus lowering the volume of (or entirely preventing) the unwanted rattling noise.

SUMMARY

This application discloses an improved filler valve for, among other things, transmitting fluid from a fluid source to a fluid destination while reducing the unwanted rattling noise. According to an embodiment, the fluid source is a pressurized source of liquid and/or gas propane and the fluid destination is a receptacle for holding liquid and/or gas propane. According to an embodiment, the filler valve includes laterally or radially extending guides defining passages or flow channels therebetween. The guides restrain a poppet head in the lateral or radial direction while the passages or flow channels enable fluid flow around the poppet and the guides. The lateral or radial restraint of the poppet head prevents the poppet head from radially or laterally colliding at high speeds with other internal components of the filler valve, such as a neck. As a result, the improved filler valve operates quietly.

This application is defined by the appended claims. The description summarizes aspects of the embodiments and should not be used to limit the claims. Other implementations are contemplated in accordance with the techniques described herein, as will be apparent upon examination of the following drawings and detailed description, and such implementations are intended to be within the scope of this application.

For a better understanding of the disclosure, reference may be made to embodiments shown in the drawings. The components in the drawings are not necessarily to scale, and related elements may be omitted so as to emphasize and clearly illustrate the novel features described herein. In addition, system components can be variously arranged, as known in the art. In the figures, like referenced numerals may refer to like parts throughout the different figures unless otherwise specified.

BRIEF DESCRIPTION OF THE DRAWINGS

FIG. 9 is a cross-sectional side view of a first alternative embodiment of the upper valve body.

FIG. 10 is a cross-sectional side view of a second alternative embodiment of the upper valve body.

FIG. 11 is a cross-sectional side view of a third alternative embodiment of the upper valve body.

DETAILED DESCRIPTION

Figure 1:
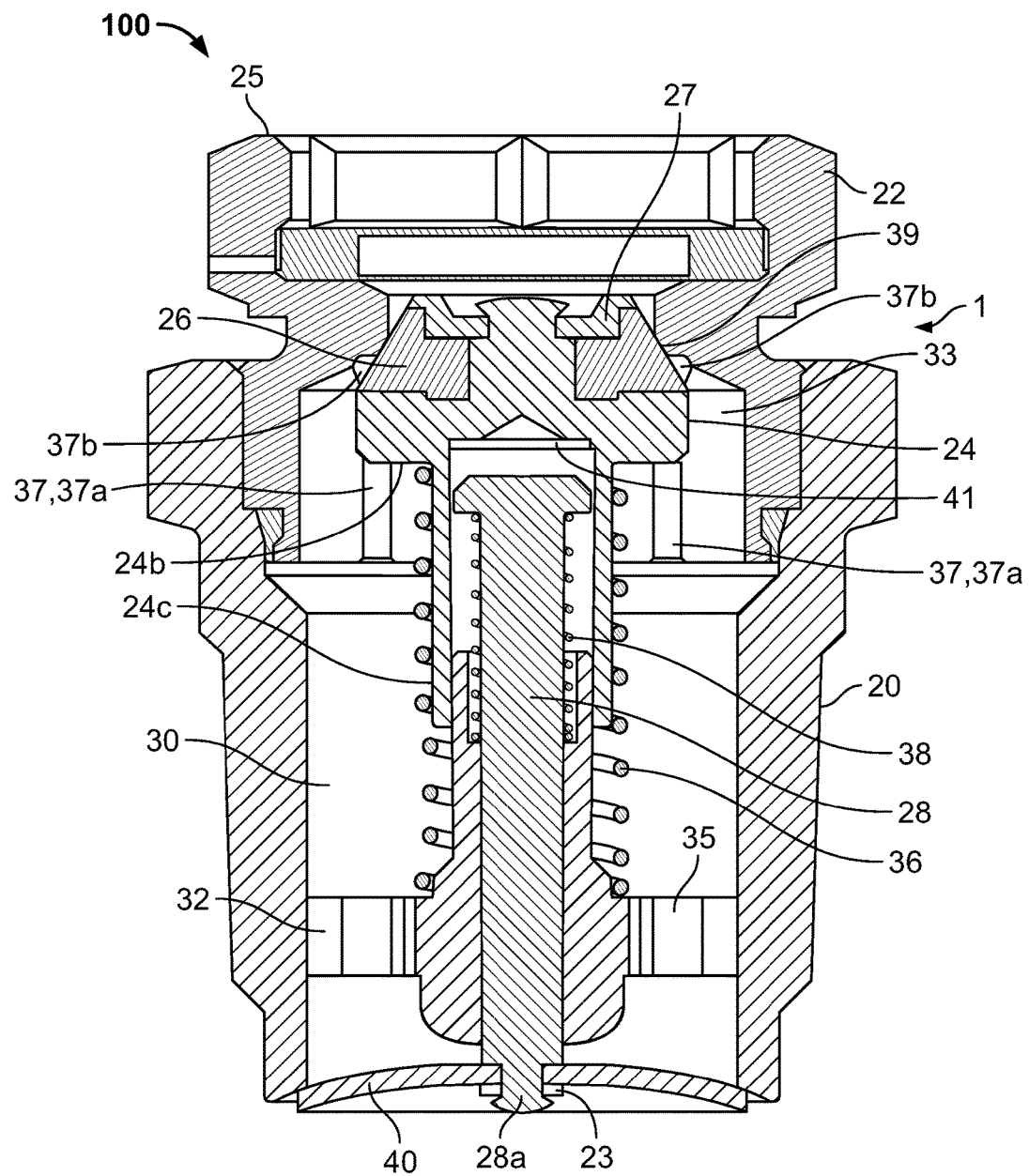
FIG. 1 is a cross-sectional side view of a filler valve in accordance with the teachings herein.

While the features, methods, devices, and systems described herein may be embodied in various forms, there are shown in the drawings, and will hereinafter be described, some exemplary and non-limiting embodiments. Not all of the depicted components described in this disclosure may be required, however, and some implementations may include additional, different, or fewer components from those expressly described in this disclosure. Variations in the arrangement and type of the components may be made without departing from the spirit or scope of the claims as set forth herein. This specification is intended to be taken as a whole and interpreted in accordance with the principles of the invention as taught herein and understood by one of ordinary skill in the art.

A filler valve 100 (also referred to as valve 100) is depicted in FIG. 1. Valve 100 includes a typical two poppet or double-check design. During use, the bottom or distal end of the valve 100 may be connected to a receptacle such as a propane tank (not shown) and the top or proximal end of the valve 100 may be connected to a source of pressurized fluid (e.g., a nozzle of a hose or conduit that delivers fluid originating at a tank). It should be appreciated that the use of positional terms such as top, bottom, distal, and proximal are relative and are used for the reader's convenience. The positional terms should not be viewed as limiting.

Figure 2:
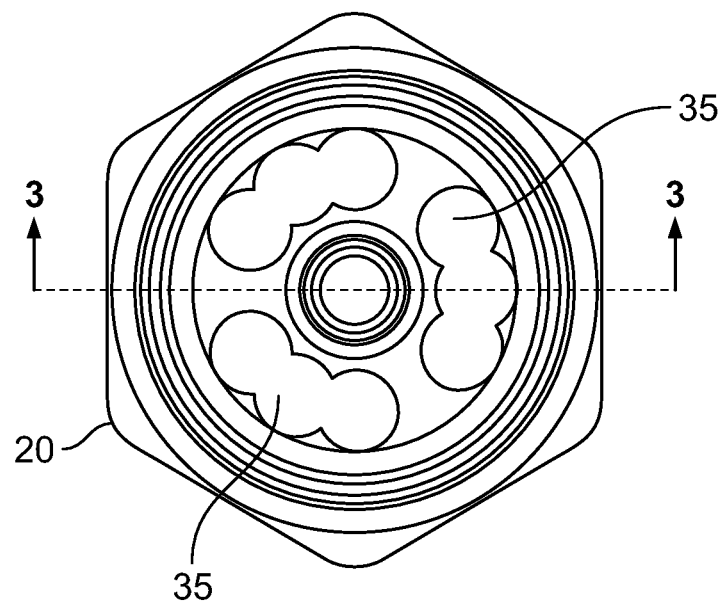
FIG. 2 is a top plan view of the lower body of the valve of FIG. 1.
Figure 3:
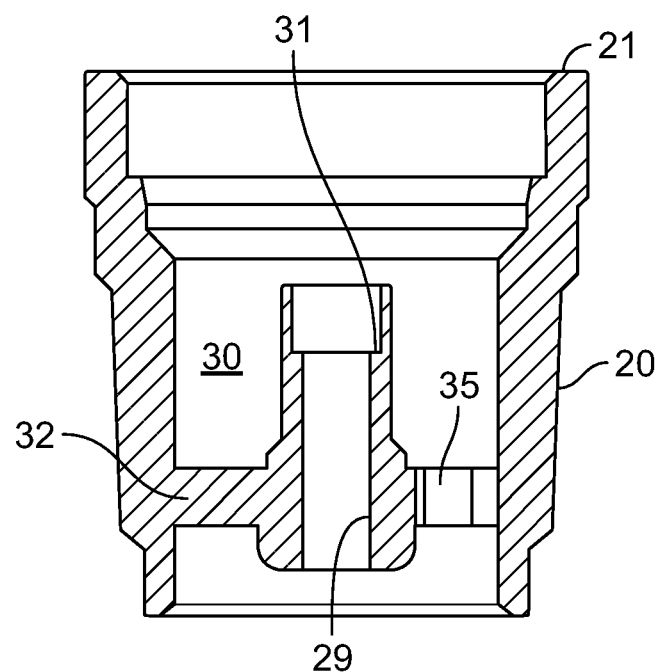
FIG. 3 is a cross-sectional side view of the lower body of the valve, taken along 3-3 of FIG. 2.
Figure 4:
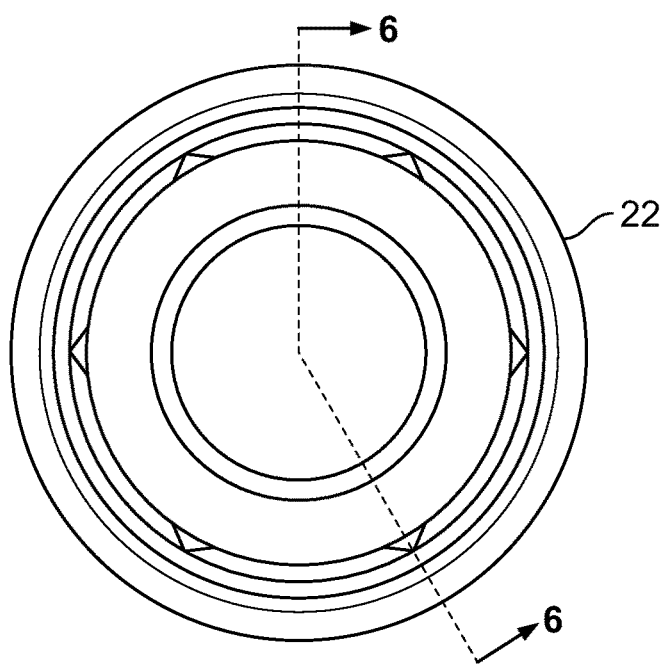
FIG. 4 is a top plan view of an upper body of the valve as disclosed in FIG. 1.
Figure 5:
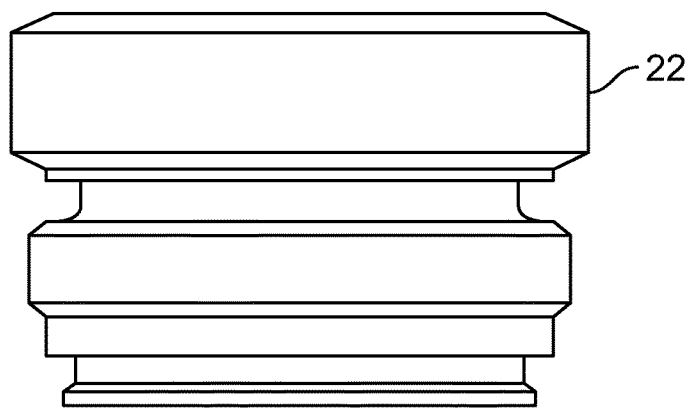
FIG. 5 is a side plan or elevation view of the upper valve body of FIG. 4.

Valve 100 includes a lower body 20 best shown in FIGS. 2 and 3, and an upper body 22, best shown in FIGS. 4-7. The combination of lower body 20 and upper body 22 forms a body 1. Lower body 20 has a top end 21 to which upper body 22 is connected to form an internal chamber 30. Upper body 22 has an inlet opening 25 at its proximal or top end to enable connection with a standard source (e.g., the nozzle of the hose or conduit). As shown in FIGS. 6, 9, 10, and 11 outer threads 45a may surround inlet opening 25 to enable connection with a hose or conduit. Body 1 defines an outlet opening (not labeled) at its bottom.

Seat and guide assembly 24 is disposed inside internal chamber 30 and is axially slideable (i.e., in the direction parallel to the major longitudinal axis of valve 100) with respect to both upper body 22 and lower body 20. Seat and guide assembly 24 (also referred as guide assembly 24), includes an upper portion and a lower portion. The upper portion includes a head or head portion 24a, a first check or first check portion 26 (also called a seat disc, a sealing element, or a sealer), and step washer 27. According to an embodiment, head or head portion 24a and first check or first check portion 26 are integral. According to an embodiment, head or head portion 24a is made from a first material (e.g., a metal) and first check or first check portion 26 is made from a second material (e.g., a compressible polymer). The lower portion includes stem or stem portion 24c and larger internal spring 36.

Larger internal spring 36 is disposed against a lower surface 24b of head 24a and against internal retainer or web 32 disposed in lower body 20. Larger internal spring 36 biases valve 100 to a closed position by compressing first check 26 against valve seat 39. Retainer 32 may be integral, joined with, or stopped against body 1. Retainer 32 is configured to arrest axial translation of stem 28 and stem portion 24c. Stem 28 stops against a ring-shaped top surface of retainer 32 (not labeled). Stem portion 24c may be configured to stop against (a) a sloped outer surface of retainer (not labeled but shown as being directly below a bottom face of stem portion 24c or (b) the top face of stem 28 when stem 28 is stopped against retainer 32.

As shown in FIG. 1, surface or valve seat 39 is part of or integral with upper body 22. The claims, however, may recite a valve seat as a different element than a body of the valve. Such a recitation is hereby defined to encompass at least both of the following cases: (a) the case where the valve seat is part of and integral with the recited body and (b) the case where the valve seat is distinct from the recited body.

As is known in the art, a second poppet assembly comprises smaller spring 38 engaged to stem 28. Stem 28 is axially slideable within opening 29 of lower body 20 and inside stem portion 24c of guide assembly 24. Stem 28 is engaged to a second check 40 via head 28a and washer 23. Opening 29 has a somewhat larger top section forming a spring seat 31 to receive and support the smaller spring 38. Smaller spring 38 biases second check 40 into compression against lower body 20. The second poppet assembly opens when sufficient pressure is applied to the top or proximal end of the guide assembly 24. The pressure causes guide assembly 24 to axially slide toward second check 40.

Eventually, an inner surface 41 of guide assembly 24 contacts a top or proximal end of stem 28 and opposes the upward biasing force of smaller spring 38. As inner surface 41 of guide assembly 24 pushes stem 28 axially downward, second check 40 retreats from an inner valve seat (not labeled) of lower body 20, enabling fluid flow via a circumferential gap defined between lower body 20 and second check 40. Application of a second check is known in the art. Retainer or web 32 defines a plurality of openings 35 that enable fluid communication between internal chamber 30 and second check 40. An outer portion of lower body 20 may be threaded to facilitate attachment to the receptacle.

One embodiment of upper body 22 is best shown in FIGS. 4-7. A preferred embodiment of upper body 22 is shown in FIG. 11. Upper body 22 includes a lower portion 42 with threads 42a for connecting to lower body 20 and a top proximal portion 45. Lower portion 42 terminates at a distal end 42b. A neck 44 is located between lower portion 42 and top portion 45. A cap (not shown) may be secured to threads 45a of top portion 45 when valve 100 is not in use.

Figure 8:
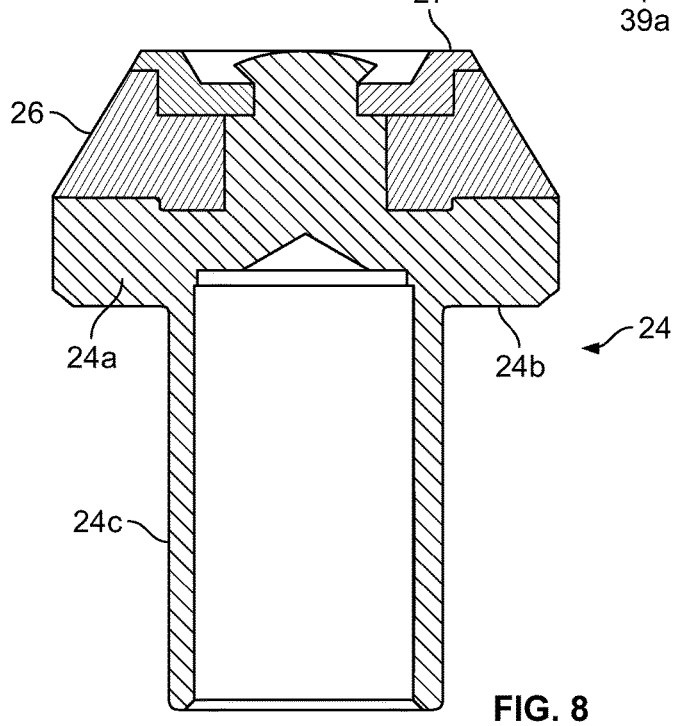
FIG. 8 is a cross-sectional side view of a seat and guide assembly of the valve of FIG. 1.

Guide assembly 24 is best shown in FIG. 8, and includes first check 26 fixed to head 24a via a step washer 27. First check 26 may be molded rubber. As stated above and shown in FIG. 1, when valve 100 is closed, first check 26 compressively engages valve seat 39.

Figure 6:
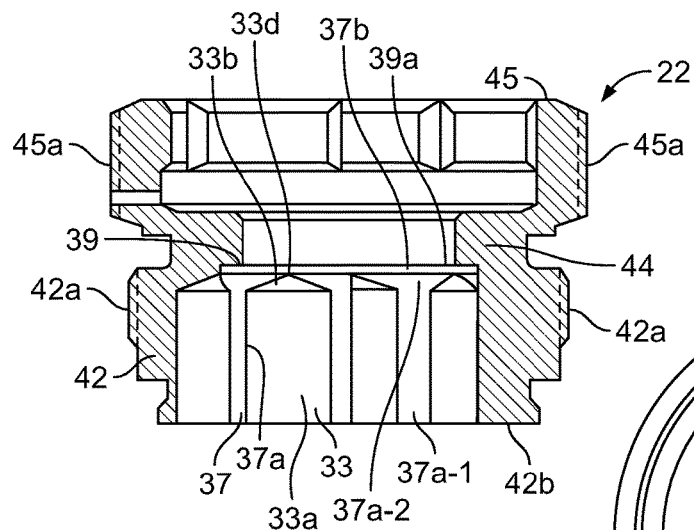
FIG. 6 is a cross-sectional side view of the upper valve body, taken along 6-6 in FIG. 4.
Figure 7:
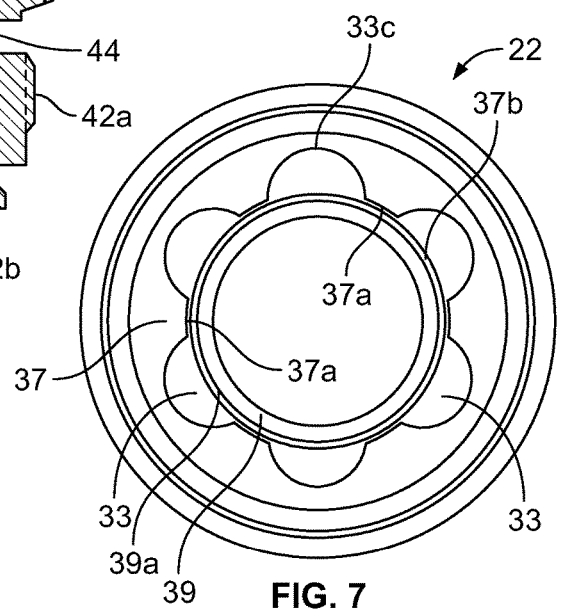
FIG. 7 is a bottom plan view of the upper valve body of FIG. 4.

As shown in FIGS. 6 and 7, upper body 22 defines a plurality of counter bores 33 (also called bores, recesses, or channels) below neck 44 and axially extending through a length of lower portion 42. According to an embodiment, and as shown in FIGS. 1 and 6, counter bores 33 axially extend for only a portion of an axial length between valve seat 39 to the distal end 42b. More specifically, and as discussed below, counter bores 33 axially extend from circumferential surface 37b to distal end 42b. When guide assembly is open, counter bores 33 function as flow passages that enable fluid flow around an outer circumference of head 24a and into internal chamber 30.

As shown in FIG. 6, each counter bore 33 include a bottom portion 33a and a top portion 33b. Bottom portion 33a is in the shape of a partial cylinder (e.g., a full cylinder with an axially extending plane removing 40 to 60% of the full cylinder to generate a semicylinder). As such, surfaces 33c of lower portion 42 are curved or arced in the circumferential direction and preferably flat in the axial direction, although surfaces 33c may be sloped in the axial direction to accommodate withdrawal of manufacturing machine tools. When the surfaces 33c are sloped in the axial direction, surfaces 33 slope outward such that the tops of surfaces 33c are closer to an axial centerline of the body 1 than the bottoms of surfaces 33c. Top portion 33b is in the shape of a partial cone (e.g., a full cone with an axially extending plane removing 40 to 60% of the full cone to generate a semicone). Each counter bore includes an apex 33d (i.e., a single top most point). It should be appreciated that apex 33d and/or top portion 33b may be absent depending on the applied manufacturing process.

By virtue of counter bores 33, and as shown in FIGS. 1, 6, and 7, upper body 22 includes a plurality of axially extending guides 37, which inwardly radially protrude from lower portion 42 toward guide assembly 24. As discussed below, each of the plurality of axially extending guides 37 includes an inner radial face 37a flush with a respective portion of a circumferential surface 37b and having (i) a trapezoidal wide portion 37a-2 and (ii) a rectangular narrow portion 37a-1.

According to an embodiment, guides 37 axially extend from an outer-most circumferential edge 39a of valve seat 39 to distal end 42b. As shown in FIGS. 1 and 6, axially extending guides 37 are part of or integral with upper body 22. The claims, however, may recite the guides separate from a body of the valve. Such a recitation is hereby defined to encompass at least both of the following cases: (a) the case where the guides are part of and integral with the recited body and (b) the case where the guides are distinct from the recited body.

Guides 37 are configured to contact the outer circumference or perimeter of head 24a to keep guide assembly 24 aligned in the axial direction (i.e., parallel to a major longitudinal axis of valve 100). Put differently, guides 37 are configured to oppose or discourage radial motion of head 24a. Guides 37 are configured to contact (and thus align) head 24a via inner radial faces 37a of the guides 37. It should be appreciated that although guides 37 are configured to contact head 24a, guides 37 are not sized to be in perpetual contact with head 24a. Put differently, when head 24a is perfectly aligned in the axial direction, minor radial gaps less than 0.3 mm separate inner radial faces 37a from the outer diameter of head 24a. During use, however, fluid forces may cause head 24a to radially oscillate. During such oscillations, head 24a may contact guides 37. Thus, due to the presence of the minor radial gaps, head 24a and inner radial faces 37a may be sized and configured such that head 24a cannot simultaneously contact all of inner radial faces 37a.

As stated above, each of the inner radial faces 37a are flush with a respective portion of circumferential surface 37b. Put differently, ring 37b may have a circumference equal to a reference circumference defined by the plurality of inner radial faces 37a. Circumferential surface 37b axially extends from outer-most circumferential edge 39a of valve seat 39 to a reference plane intersecting each apex 33d.

Inner radial faces 37a may be flat or sloped (depending on the applied manufacturing process) in the axial direction and curved (arced) in the circumferential direction. When inner radial faces 37a are sloped in the axial direction, inner radial faces 37a slope outward such that the tops of inner radial faces 37a are closer to an axial centerline of the body 1 than the bottoms of inner radial faces 37a. As shown in FIG. 7, the inner radial faces 37a may have a circumferential curvature that matches or corresponds to the curvature of the outer circumference of head 24a. The inner radial faces 37a may axially extend for a distance greater than the axial length of head 24a (i.e., in the axial direction from first check 26 to stem portion 24c) to align head 24a as head 24a axially slides or translates downward. According to some embodiments, the inner radial faces 37a axially extend for a length that is at least 1.1, 1.2, 1.5 or 2 times greater than the axial length of head 24a.

Inner radial faces 37a are smooth. They may be polished to an excellent surface finish. As shown in FIG. 6, each inner radial face 37a includes a narrow portion 37a-1, a wide portion 37a-2. Narrow portion 37a-1 and wide portion 37a-2 are flush with identical curvatures in the circumferential direction at least where narrow portion 37a-1 meets wide portion 37a-2. When viewed in cross section from a plan perspective, narrow portion 37a-1 is a rectangle and wide portion 37a-2 is a trapezoid, with a top shorter side of the trapezoid joining the narrow portion 37a-1 and a lower longer side of the trapezoid joining the respective portion of the circumferential surface 37b. As stated above, and according to desirable embodiments, narrow portion 37a-1 and wide portion 37a-2 are flat in the axial direction.

Alternatively, one or both of narrow portion 37a-1 and wide portion 37a-2 may slope in the axial direction. As discussed above, when one or both of narrow portion 37a-1 and wide portion 37a-2 slope in the axial direction, the slope is outward (from the top down) such that a higher point is located closer to the axial centerline of body 1 than a lower point.

FIG. 7 shows a minor radial gap between inner radial faces 37a and circumferential surface 37b. Circumferential surface 37b may be flat in the axial direction (according to certain desirable embodiments) or may be sloped in the axial direction. When circumferential surface 37b slopes in the axial direction, the slope is outward (from the top down), such that a higher point of circumferential surface 37b is located closer to the axial centerline of body 1 than a lower point of circumferential surface 37b.

According to desirable embodiments, guides 37 are radially sized to leave minor gaps of less than 0.01, 0.03, 0.05, 0.1, 0.15, 0.20, 0.25, 0.5, 1.0, 2.0, or 5.0 mm between head 24a and the inner radial faces 37a. Minor gaps of less than 0.30 mm are especially desirable. Put differently, a reference circumference defined by the plurality of inner radial faces (see FIG. 7) may be slightly larger than the outer circumference of head 24a. Such a radial sizing enables head 24a to axially slide with respect to upper body 22 without frictional contact between the outer circumference of head 24a and the inner radial faces. Guides 37 may be configured to contact the outer circumference of head 24a via a grease or film applied to the inner radial faces 37a.

Guides 37 and/or head 24a may be non-metallic (e.g., polymeric) to dampen impact between head 24a and guides 37. As stated above, head 24a contacts guides 37 during radial oscillation, but not when head 24a is perfectly axially aligned with the longitudinal axis. As such, head 24a is configured to contact guides 37 and guides 37 are configured to contact head 24a.

As stated above, radial collisions between internal components of filler valves produce a rattling noise. Because guides 37 discourage radial oscillation of guide assembly 24 inside valve 100, guides 37 reduce the rattling noise. Guides 37 may not completely eliminate the rattling noise since guide assembly 24 is still able to perform minor radial oscillations due to the minor gaps. Such an effect is particularly useful when guide assembly 24 is near neck 44. In such a case, even minor radial motion or oscillation of first check 26 may cause first check 26 to periodically collide with neck 44, thus contributing to the rattling noise.

As stated above, guide assembly 24 (and thus first check 26) is likely to be near neck 44 when the pressure differential at the top or proximal end of valve 100 (i.e., above step washer 27) is great enough to crack or slightly open valve 100, but is not sufficient to fully open the valve 100. Even when valve 100 is in the cracked or slightly opened position, counter bores 33 offer a fluid path of sufficient size to enable fluid flow through valve 100. As shown in FIG. 7, counter bores 33 and guides 37 are spaced equidistantly around an inner circumference of neck lower portion 42.

As stated above, some features of the inner radial faces 37a (also called inner faces) and/or surfaces 33c of counterbores 33 may be outwardly sloped (from top to bottom). Such a slope, if present, enables a greater volume of fluid flow through valve 1 as head 24a moves axially downward. Put differently, such a slope, if present, provides additional volume for fluid to flow radially around head 24a when head 24a is in an axially downward position (i.e., further away from valve seat 39). According to an embodiment, the degree of outward slope of surfaces 33c of counterbores 33 is equal to the degree of outward slope of one or more of the narrow portions 37a-1 and the wide portions 37a-2 of inner radial faces 37a.

Alternative embodiments 122, 222 and 322 of upper valve body 22 are shown in FIGS. 9, 10 and 11. The embodiment of FIG. 11 is desirable. Alternative embodiments 122, 222, and/or 322 may share the same features as upper valve body 22, except where noted otherwise. Alternative embodiments 122, 222, and 322 define the previously discussed minor radial gaps between the outer diameter of head portion 24a and the inner radial faces of the guides.

With reference to FIG. 11, upper valve body 322 includes a ring-shaped valve seat 341, a circumferential surface 337b, a plurality of guides 337, a plurality of counterbores 333 (also called bores, recesses, or channels) disposed between adjacent guides 337, a first transition 351a and a second transition 351b collectively defining a transition void (not labeled), and an intermediate outlet portion 351c defining a cylindrical intermediate outlet void (not labeled). Guides 337 include inner radial faces 337a. Inner radial faces 337a include a rectangular narrow portion 337a-1 and a trapezoidal wide portion 337a-2. Valve seat 341, circumferential surface 337b, guides 337, inner radial faces 337a of guides 337, and counterbores 333 may include the same features as previously discussed with reference to valve seat 39, circumferential surface 37b, guides 37, inner radial faces 37a of guides 37, and counterbores 33 of upper valve body 22. Although a line separates circumferential surface 337b from trapezoidal wide portion 337a-2 in FIG. 11, in practice, the two surfaces may be flush.

With continued reference to FIG. 11, first transition 351a slopes radially outwardly from inner radial faces 337a. Second transition 351b slopes radially outwardly from first transition 351a to intermediate outlet portion 351c. Intermediate outlet portion 351c may be curved or arced in the circumferential direction and flat in the axial direction. Intermediate outlet portion 351c may thus be the widest portion of upper valve body 322 below valve seat 341. First transition 351a, second transition 351b, and intermediate outlet portion 351c may be ring shaped (subject to the artifacts discussed below).

Counterbores 333 may include a bottom partially cylindrical portion 333a and a top portion 333b, which may share the same features as bottom portion 33a and top portion 33b of upper valve body 22. The process used to generate counterbores 333 may result in artifacts 391 below reference segment 390 (which is collinear with the edge defined between inner radial face 337a and first transition 351a). Artifacts 391 may include a wide groove 392 and a narrow groove 393. The location of reference segment 390 can thus be thought of as the distal end of counterbores 333 (and the counterbores of the other embodiments).

Artifacts 391 may accommodate a minor amount of fluid flow, but are generally remnants of the subtractive machining process used to define counterbores 333. As such, artifacts 391 can be thought of as minor indentations or recesses defined in transitions 351a and 351b and outlet 351c. A circumferential width of each artifact decreases from transition 351a to intermediate outlet portion 351c. Even though guides 337 may be integral with upper valve body 332, first and second transitions 351a, 351b are not considered to be features of guides 337 unless otherwise stated. Although artifacts 391 are in fluid communication with counterbores 333 (also called channels), artifacts 391 are generally not considered to be a part of counterbores 333 unless otherwise stated (i.e., counterbores 333 are not considered to comprise artifacts 391 unless otherwise stated).

Artifacts 391 may have a radius of curvature, over some or all of their complete surface area, equal to a radius of curvature of each of the counterbores 333.

Upper valve bodies 122 and 222 of FIGS. 9 and 10 are the same as upper valve body 322 of FIG. 11, except for the shape of the transitions (and thus the shape of the artifacts 191, 291 formed via the counterbore process). In FIG. 11, and with respect to the longitudinal axis, first transition 351a may be at a fifteen degree angle, second transition 351b may be at a sixty degree angle, and intermediate outlet portion 351c may be collinear. In FIG. 10, with respect to the longitudinal axis first transition 251a may be at a twenty degree angle, second transition 251b may be at a 55 degree angle, and intermediate outlet portion 251c may be collinear. In FIG. 9, transition 151 may be arced with respect to the longitudinal axis. Transition 151 may terminate at an intermediate outlet portion 151a collinear with the longitudinal axis.

The radially outward slopes of transitions 151, 251a, 251b, 351a, and 351b and the wider diameter of intermediate outlet portions 151a, 251c, and 351c (compared with the inner radial faces of the guides) offer the following advantages: First, these widening features enable a greater volume of fluid flow once first check 26 axially retreats (i.e., moves axially downward) to become laterally coplanar therewith. Put differently, these widening features enable a greater volume of fluid flow between first check 26 and upper valve bodies 122, 222, and 322. Second, these widening features advantageously inwardly funnel first check 26 when first check 26 moves axially upward and toward the valve seat.

For example, with reference to FIG. 6 first check 26 may become stuck on lower surfaces of guide 37, thus preventing first check 26 from moving axially upward. These widening features draw first check 26 inward and discourage first check 26 from becoming stuck on any lower surfaces beneath guides 337. According to various embodiments, upper valve bodies 122, 222, and 322 and retainer 32 are sized and configured such that at least a portion of first check 26 is always above intermediate outlet portion 151a, 251c, 351c. Put differently, while fluid pressure may cause head portion 24a to fully axially retreat below intermediate outlet portion 151a, 251c, 351c, retainer 32 will stop stem portion 24c before first check 26 fully retreats axially below intermediate outlet portion 151a, 251c, 351c. According to one embodiment, retainer 35 prevents any portion of first check 26 from retreating below intermediate outlet portion 151a, 251c, 351c.

It should thus be appreciated that the present application discloses a valve for conveying fluid from a source to a destination, the valve comprising: a body defining an inlet configured to receive fluid from the source; a valve seat; a guide assembly comprising (a) an upper portion comprising a check portion and a head portion, and (b) a lower portion comprising a stem portion and a first spring; wherein the guide assembly is configured to move between (a) a first closed position where the check portion contacts the valve seat and (b) a first open position where the check portion is spaced apart from the valve seat, the first spring biasing the guide assembly to the first closed position; a plurality of guides joined with the body and being sized and configured to contact the upper portion of the guide assembly to discourage radial oscillation thereof.

The body may define at least one channel located between at least two of the plurality of guides, the at least one channel being in fluid communication with the inlet when the guide assembly is in the first open position.

The at least one channel may have an axially extending major longitudinal axis that is parallel to a major longitudinal axis of the body, wherein the major longitudinal axis of the at least one channel is offset from the major longitudinal axis of the body such that the major longitudinal axis of the body does not intersect the at least one channel.

The at least one channel may have a length in a direction parallel to a major axis of the body, the head portion may have a length in the direction parallel to the major axis of the body, and the length of the at least one channel may exceed the length of the head portion.

The body may define a plurality of channels, each of the plurality of channels being located between at least two of the plurality of guides.

Each of the guides may be diametrically opposed with another of the guides and a total number of the plurality of channels may be equal to a total number of the plurality of guides.

At least one of the plurality of channels may have a length in a direction parallel to a major axis of the body, at least one of the plurality of guides may have a length in the direction parallel to the major axis of the body, and the length of the at least one channel may be shorter than the length of the at least one guide.

The valve may be configured and arranged such that all of the channels are in fluid communication with the inlet when the guide assembly is in the first open position and none of the channels are in fluid communication with the inlet when the guide assembly is in the first closed position.

Each of the plurality of guides may include an inner face, each of the plurality of guides may be sized and configured to contact the upper portion of the guide assembly via the inner face, and the inner faces may have a radius of curvature exceeding a maximum outer radius of the upper portion of the guide assembly.

The inner faces of the plurality of guides and an outer surface of the head portion may be polished to an excellent surface finish.

Each of the plurality of channels may be axially spaced from the valve seat, such that when the guide assembly is in the first open position, at least some fluid passes along the valve seat before entering one of the plurality of channels.

The valve may comprise an artifact extending from the channel, the artifact being a recess having a radial depth less than a radial depth of the channel.

The valve may comprise a plurality of transitions, each of the plurality of transitions extending from the body to one of the plurality of guides, each of the plurality of transitions having a radial thickness less than a minimum radial thickness of any of the plurality of guides.

Further disclosed is a valve for conveying fluid from a source to a destination, the valve comprising: a body defining an inlet configured to receive fluid from the source; a valve seat; a guide assembly comprising (a) an upper portion comprising a check portion and a head portion, and (b) a lower portion comprising a stem portion and a first spring; wherein the guide assembly is configured to move between (a) a first closed position where the check portion contacts the valve seat and (b) a first open position where the check portion is spaced apart from the valve seat, the first spring biasing the guide assembly to the first closed position; a plurality of guides joined with the body and defining a plurality of axially extending channels, the plurality of guides and being sized and configured (a) to contact the upper portion of the guide assembly to discourage radial oscillation thereof, (b) such that when the guide assembly is axially aligned with a longitudinal axis of the body, minor radial gaps are defined between each of the plurality of guides and the upper portion of the guide assembly, (c) such that the upper portion of the guide assembly, when misaligned with the longitudinal axis of the body, may contact some, but not all of the plurality of guides.

The body may comprise: a ring-shaped intermediate outlet portion defining a cylindrical intermediate outlet void, one or more transitions extending from the intermediate outlet portion to each of the plurality of guides, a first radial distance between the longitudinal axis of the body and at least one of the plurality of guides being less than a second radial distance between the longitudinal axis of the body and at least one of the one or more transitions, which is less than a third radial distance between the longitudinal axis of the body and the intermediate outlet portion.

The guide assembly may be configured to move to a second open position where the check portion is spaced apart from the valve seat and intersecting a reference plane defined by the intermediate outlet portion, the reference plane being perpendicular to the longitudinal axis of the body.

The valve may comprise a retainer, the retainer being integral with, fixed with respect to, or stopped against the body, the retainer being configured to arrest axial translation of the guide assembly along the longitudinal axis of the body when the guide assembly is in a fourth open position; wherein, when the guide assembly is in the fourth open position, the upper portion of the guide assembly intersects the reference plane defined by the intermediate outlet portion.

The valve may comprise at least one artifact extending from at least one of the channels, the artifact being a minor recess defined in the body, wherein the one or more transitions serve to funnel the upper portion of the guide assembly from the fourth open position to the first closed position, and the valve seat, the plurality of guides, the transitions, and the intermediate outlet portion are integral with the body.

Disclosed is a valve for conveying fluid from a source to a destination, the valve comprising: a body defining an inlet configured to receive fluid from the source; a valve seat; a guide assembly comprising (a) an upper portion comprising a check portion and a head portion, and (b) a lower portion comprising a stem portion and a first spring; wherein the guide assembly is configured to move between (a) a first closed position where the check portion contacts the valve seat and (b) a first open position where the check portion is spaced apart from the valve seat, the first spring biasing the guide assembly to the first closed position; a plurality of guides joined with the body and defining a plurality of axially extending channels, the plurality of guides and being sized and configured (a) to contact the upper portion of the guide assembly to discourage radial oscillation thereof, (b) such that when the guide assembly is axially aligned with a longitudinal axis of the body, minor radial gaps are defined between each of the plurality of guides and the upper portion of the guide assembly, (c) such that the upper portion of the guide assembly, when misaligned with the longitudinal axis of the body, may contact some, but not all of the plurality of guides; wherein when the guide assembly is in the first open position, the plurality of axially extending channels are in fluid communication with the inlet.

At least one of the plurality of channels may include an upper portion and a lower portion, the upper portion of the at least one channel being in a shape of a partial cone and the lower portion of the at least one channel being in a shape of a partial cylinder, and at least one of the plurality of guides may include an inner radial face having an upper portion and a lower portion, the upper portion of the inner radial face being trapezoidal and the lower portion of the inner radial face being rectangular.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

It should be appreciated that although some elements of the claims may be separately recited, such elements may be integral. For example, the claims may recite a body and a plurality of guides. In such a case, the body and the plurality of guides may be integrally formed from a single block of metal or the body or the plurality of guides may be nonintegral. As another example, the claims may recite a body and a valve seat. In such a case, the body and the valve seat may be integrally formed from a single block of metal or the body and the valve seat may be nonintegral.

What is claimed is:

1. A valve for conveying fluid from a source to a destination, the valve comprising:
    a body defining an inlet configured to receive fluid from the source;
    a valve seat;
    a guide assembly comprising (a) an upper portion comprising a check portion and a head portion, and (b) a lower portion comprising a stem portion and a first spring;
    wherein the guide assembly is configured to move between (a) a first closed position where the check portion contacts the valve seat and (b) a first open position where the check portion is spaced apart from the valve seat, the first spring biasing the guide assembly to the first closed position; and
    a plurality of guides joined with the body and being sized and configured to contact the upper portion of the guide assembly to discourage radial oscillation thereof;
    wherein each of the plurality of guides includes an inner face, each of the plurality of guides are sized and configured to contact the upper portion of the guide assembly via the respective inner face, and each of the inner faces has a radius of curvature exceeding a maximum outer radius of the upper portion of the guide assembly.

2. The valve of claim 1, wherein the body defines at least one channel located between at least two of the plurality of guides, the at least one channel being in fluid communication with the inlet when the guide assembly is in the first open position.

3. The valve of claim 2, wherein the at least one channel has an axially extending longitudinal axis that is parallel to a longitudinal axis of the body, wherein the longitudinal axis of the at least one channel is offset from the longitudinal axis of the body such that the longitudinal axis of the body does not intersect the at least one channel.

4. The valve of claim 3, wherein the at least one channel has a length in a direction parallel to the longitudinal axis of the body, the head portion has a length in the direction parallel to the longitudinal axis of the body, and the length of the at least one channel exceeds the length of the head portion.

5. The valve of claim 1, wherein the body defines a plurality of channels, each of the plurality of channels being located between at least two of the plurality of guides.

6. The valve of claim 5, wherein each of the plurality of guides is diametrically opposed with another of the plurality of guides and a total number of the plurality of channels is equal to a total number of the plurality of guides.

7. The valve of claim 5, wherein at least one of the plurality of channels has a length in a direction parallel to the longitudinal axis of the body, at least one of the plurality of guides has a length in the direction parallel to the longitudinal axis of the body, and the length of the at least one channel is shorter than the length of the at least one guide.

8. The valve of claim 5, configured and arranged such that all of the channels are in fluid communication with the inlet when the guide assembly is in the first open position and none of the channels are in fluid communication with the inlet when the guide assembly is in the first closed position.

9. The valve of claim 1, wherein the inner faces of the plurality of guides and an outer surface of the head portion are polished.

10. The valve of claim 5, wherein each of the plurality of channels is axially spaced from the valve seat, such that when the guide assembly is in the first open position, at least some fluid passes along the valve seat before entering one of the plurality of channels.

11. A valve for conveying fluid from a source to a destination, the valve comprising:
    a body defining an inlet configured to receive fluid from the source;
    a valve seat;
    a guide assembly comprising (a) an upper portion comprising a check portion and a head portion, and (b) a lower portion comprising a stem portion and a first spring;
    wherein the guide assembly is configured to move between (a) a first closed position where the check portion contacts the valve seat and (b) a first open position where the check portion is spaced apart from the valve seat, the first spring biasing the guide assembly to the first closed position;
    a plurality of guides joined with the body and being sized and configured to contact the upper portion of the guide assembly to discourage radial oscillation thereof,
    wherein the body defines at least one channel located between at least two of the plurality of guides, the at least one channel being in fluid communication with the inlet when the guide assembly is in the first open position; and
    an artifact extending from the at least one channel, the artifact being a recess having a radial depth less than a radial depth of the at least one channel.

12. The valve of claim 1, further comprising a plurality of transitions, each of the plurality of transitions extending from the body to one of the plurality of guides, each of the plurality of transitions having a radial thickness less than a minimum radial thickness of any of the plurality of guides.

13. A valve for conveying fluid from a source to a destination, the valve comprising:
    a body defining an inlet configured to receive fluid from the source;
    a valve seat;
    a guide assembly comprising (a) an upper portion comprising a check portion and a head portion, and (b) a lower portion comprising a stem portion and a first spring;
    wherein the guide assembly is configured to move between (a) a first closed position where the check portion contacts the valve seat and (b) a first open position where the check portion is spaced apart from the valve seat, the first spring biasing the guide assembly to the first closed position; and a plurality of guides joined with the body and defining a plurality of axially extending channels, the plurality of guides and being sized and configured (a) to contact the upper portion of the guide assembly to discourage radial oscillation thereof, (b) such that when the guide assembly is axially aligned with a longitudinal axis of the body, minor radial gaps are defined between each of the plurality of guides and the upper portion of the guide assembly, (c) such that the upper portion of the guide assembly, when misaligned with the longitudinal axis of the body, may contact some, but not all of the plurality of guides;

wherein the body comprises: a ring-shaped intermediate outlet portion defining a cylindrical intermediate outlet void, one or more transitions extending from the intermediate outlet portion to each of the plurality of guides, a first radial distance between the longitudinal axis of the body and at least one of the plurality of guides being less than a second radial distance between the longitudinal axis of the body and at least one of the one or more transitions, which is less than a third radial distance between the longitudinal axis of the body and the intermediate outlet portion.

14. The valve of claim 13, wherein the guide assembly is configured to move to a second open position where the check portion is spaced apart from the valve seat and intersecting a reference plane defined by the intermediate outlet portion, the reference plane being perpendicular to the longitudinal axis of the body.

15. The valve of claim 14, further comprising a retainer, the retainer being integral with, fixed with respect to, or stopped against the body, the retainer being configured to arrest axial translation of the guide assembly along the longitudinal axis of the body when the guide assembly is in a fourth open position;

wherein, when the guide assembly is in the fourth open position, the upper portion of the guide assembly intersects the reference plane defined by the intermediate outlet portion.

16. The valve of claim 15, further comprising at least one artifact extending from at least one of the channels, the artifact being a minor recess defined in the body, wherein the one or more transitions serve to funnel the upper portion of the guide assembly from the fourth open position to the first closed position, and the valve seat, the plurality of guides, the transitions, and the intermediate outlet portion are integral with the body.

17. A valve for conveying fluid from a source to a destination, the valve comprising:

a body defining an inlet configured to receive fluid from the source;

a valve seat;

a guide assembly comprising (a) an upper portion comprising a check portion and a head portion, and (b) a lower portion comprising a stem portion and a first spring;

wherein the guide assembly is configured to move between (a) a first closed position where the check portion contacts the valve seat and (b) a first open position where the check portion is spaced apart from the valve seat, the first spring biasing the guide assembly to the first closed position; and a plurality of guides joined with the body and defining a plurality of axially extending channels, the plurality of guides and being sized and configured (a) to contact the upper portion of the guide assembly to discourage radial oscillation thereof, (b) such that when the guide assembly is axially aligned with a longitudinal axis of the body, minor radial gaps are defined between each of the plurality of guides and the upper portion of the guide assembly, (c) such that the upper portion of the guide assembly, when misaligned with the longitudinal axis of the body, may contact some, but not all of the plurality of guides;

wherein when the guide assembly is in the first open position, the plurality of axially extending channels are in fluid communication with the inlet; and wherein at least one of the plurality of channels includes an upper channel portion and a lower channel portion, the upper channel portion of the at least one channel being in a shape of a partial cone and the lower channel portion of the at least one channel being in a shape of a partial cylinder, and at least one of the plurality of guides includes an inner radial face having an upper guide portion and a lower guide portion, the upper guide portion of the inner radial face being trapezoidal and the lower guide portion of the inner radial face being rectangular.

\* \* \* \* \*